United States Patent
Amirkhanyan et al.

(10) Patent No.: US 9,514,258 B2
(45) Date of Patent: Dec. 6, 2016

(54) GENERATION OF MEMORY STRUCTURAL MODEL BASED ON MEMORY LAYOUT

(75) Inventors: Karen Amirkhanyan, Yerevan (AM); Karen Darbinyan, Pleasanton, CA (US); Arman Davtyan, Yerevan (AM); Gurgen Harutyunyan, Abovyan (AM); Samvel Shoukourian, Yerevan (AM); Valery Vardanian, Yerevan (AM); Yervant Zorian, Santa Clara, CA (US)

(73) Assignee: Synopsys, Inc., Mountain View, CA (US)

( * ) Notice: Subject to any disclaimer, the term of this patent is extended or adjusted under 35 U.S.C. 154(b) by 915 days.

(21) Appl. No.: 13/531,189

(22) Filed: Jun. 22, 2012

(65) Prior Publication Data

US 2013/0346056 A1 Dec. 26, 2013

(51) Int. Cl.
G06F 17/50 (2006.01)

(52) U.S. Cl.
CPC ....... G06F 17/5045 (2013.01); G06F 17/5081 (2013.01); *G06F 2217/02* (2013.01); *G06F 2217/14* (2013.01)

(58) Field of Classification Search
CPC .............. G06F 17/5009; G06F 17/5022; G06F 17/5045
USPC ..................................................... 703/13, 14
See application file for complete search history.

(56) References Cited

U.S. PATENT DOCUMENTS

| | | | |
|---|---|---|---|
| 6,249,901 B1 * | 6/2001 | Yuan et al. | 716/103 |
| 6,601,205 B1 * | 7/2003 | Lehmann | G01R 31/31837 345/551 |
| 7,464,350 B1 | 12/2008 | Ho | |
| 7,768,840 B1 * | 8/2010 | Aleksanyan | G11C 7/1012 365/189.02 |
| 8,112,730 B2 | 2/2012 | Aleksanyan et al. | |
| 2006/0120167 A1 | 6/2006 | Bhadra et al. | |
| 2006/0123377 A1 | 6/2006 | Schultz et al. | |
| 2009/0106716 A1 * | 4/2009 | Aleksanyan | G01R 31/31835 716/106 |

OTHER PUBLICATIONS

Eleyan, N. et al., "Automated Flow for Generating CMOS Custom Memory Bit Map Information using ESPCV", Qualcomm, SNUG 2011, 11 pages.
PCT International Search Report and Written Opinion, PCT Application No. PCT/US2013/043767, Jan. 3, 2014, 16 pages.

\* cited by examiner

*Primary Examiner* — Omar Fernandez Rivas
*Assistant Examiner* — Shiuh-Huei Ku
(74) *Attorney, Agent, or Firm* — Fenwick & West LLP (57) ABSTRACT

A memory structural model is generated directly from memory configuration information and memory layout information in an efficient manner. Information on strap distribution is generated by analyzing configuration information of the memory and the corresponding memory layout. Information on scrambling of addresses in the memory layout is generated by programming the memory layout with physical bit patterns, extracting corresponding logical bit patterns and then analyzing the discrepancy between the physical bit patterns and the logical bit patterns. The strap distribution information and the address scrambling information are combined into the memory structural model used for designing an efficient test and repair engine.

21 Claims, 7 Drawing Sheets

GENERATION OF MEMORY STRUCTURAL MODEL BASED ON MEMORY LAYOUT

BACKGROUND

1. Field of the Disclosure

The present disclosure relates to memory design, and more particularly to generating a memory structural model that may be used for designing an efficient test and repair engine of a memory instance.

2. Description of the Related Art

Some processes for designing integrated circuits define memory devices as a set of parameterized templates. A chip designer may use such set of parameterized templates to design and incorporate certain memory devices into a design of an integrated circuit (IC). The parameterized templates are often provided by memory device design providers in the form of electronic files. The chip designer may conveniently incorporate instances of the memory devices into an IC by configuring parameters associated with the templates using various electronic design automation (EDA) tools.

The designing process of an IC includes a process of designing a test and repair engine for the memory instances. As part of this process, the test and repair engine may include generation of background data patterns that are written to the memory instance and then read back for comparison. By analyzing the programmed data patterns and the read data patterns, the test and repair engine may detect flaws in the operation of the memory instance and take remedial actions.

To design an efficient test and repair engine for a memory instance or design, a chip designer may use a logical model corresponding to the layout of the memory instance being incorporated into the IC design. However, the generation of the logical memory model may involve a large amount of time and computation. Further, the chip designer may not possess requisite information for generating the logical model. Hence, the process of designing the test and repair engine of a memory instance is often fraught with inefficiencies and difficulties.

SUMMARY

Embodiments relate to generating a memory structural model of a memory instance by programming physical bit patterns into a memory layout of the memory instance, performing simulation of the programmed memory instance, extracting logical bit patterns corresponding to the physical patterns, and comparing the physical bit patterns and the extracted logical bit patterns. Depending on the address scrambling of the memory instance, the logical bit patterns derived from the same physical bit patterns may differ. Hence, by analyzing the relationships between the logical bit patterns and their counterpart logical bit patterns, the address scrambling of the memory instance can be determined.

In one embodiment, the physical bit patterns to be used are determined based on the configuration information of the memory instance such as the number of rows and the number of columns in a memory array of the memory instance.

In one embodiment, the physical bit patterns to be used include a solid pattern. The solid bit pattern may be used for determining bit-line distribution of cells in the memory instance.

In one embodiment, the physical bit patterns to be used include a triangular pattern. The triangular pattern is used for determining row scrambling of all rows in the memory instance and column scrambling of a subset of columns in the memory instance if the memory instance has more columns of cells than the rows of cells. The triangular pattern is used for determining column scrambling of all columns in the memory instance and row scrambling of a subset of rows in the memory instance if the memory instance has more rows of cells than the columns of cells.

In one embodiment, the physical bit patterns to be used include one or more binary patterns. The one or more binary patterns are used for determining column scrambling of remaining columns in the memory instance if the memory instance has more columns of cells than rows of cells. Alternatively, the one or more binary patterns are used for determining row scrambling of remaining rows if the memory instance has more rows of cells than columns of cells.

In one embodiment, strap information of the memory instance is generated by applying parameters in configuration information to memory layout information. The configuration information may be received from a chip designer. The strap information may indicate locations and sizes of one or more vertical or horizontal straps in the memory instance.

In one embodiment, the memory structural model is generated by combining the strap information and information indicative of the address scrambling.

BRIEF DESCRIPTION OF THE DRAWINGS

The teachings of the embodiments can be readily understood by considering the following detailed description in conjunction with the accompanying drawings.

DETAILED DESCRIPTION OF EMBODIMENTS

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

Embodiments of the present disclosure relate to generating a memory structural model of a memory instance directly from configuration information of the memory instance and memory layout information in an efficient manner. Information on strap distribution is generated by analyzing configuration information of the memory in view of the corresponding memory layout. Information on scrambling of addresses in the memory layout is generated by programming the memory layout with physical bit patterns, simulating the programmed memory layout, extracting logical bit patterns corresponding to the physical patterns by simulation and then analyzing the relationships between the physical bit patterns and the logical bit patterns. The strap distribution information and the address scrambling information are combined into the memory structural model for designing an efficient test and repair engine.

A memory structural model as described herein refers to a model of a memory instance that defines the structure of the memory instance. In one embodiment, the memory structure model includes address scrambling information and strap distribution information.

The address scrambling information as described herein indicates the mapping between the logical addresses and the physical addresses of the memory instance. For example, the address scrambling indicates the presence of bit-line distribution, row scrambling, and column scrambling.

The strap distribution information described herein refers to information about straps associated with a memory array in the memory instance. A strap described herein refers to components of the memory instance for supporting the operations of bit cells in the memory instance. The strap may include, for example, address decoders, sense amplifiers, input/output (I/O) circuits associated with rows and/or columns of cells. The strap distribution indicates the distribution of straps in the memory instance, including, for example, the location, orientation (e.g., horizontal or vertical) and the size of straps in the memory instance.

A physical bit pattern described herein refers to a combination of bits being programmed into physical locations of a memory instance or a memory layout. The physical locations can be indicated by physical addresses, for example by rows and columns.

A logical bit pattern described herein refers to a combination of bits programmed into a memory instance or a memory device or read from the memory instance of the memory device that is identified by logical addresses. When various address scrambling schemes are present, the logical addresses and the physical addresses may not coincide. The logical bit patterns are organized according to logical addresses.

Memory layout information described herein refers to planar geometric information about a memory device. The memory layout information may indicate, for example, patterns of metal, oxide or semiconductor layers included as components of the memory device. The memory layout information may be represented, for example, using a GDS format or other similar formats.

Overall Integrated Circuit Design Process

Figure 1:
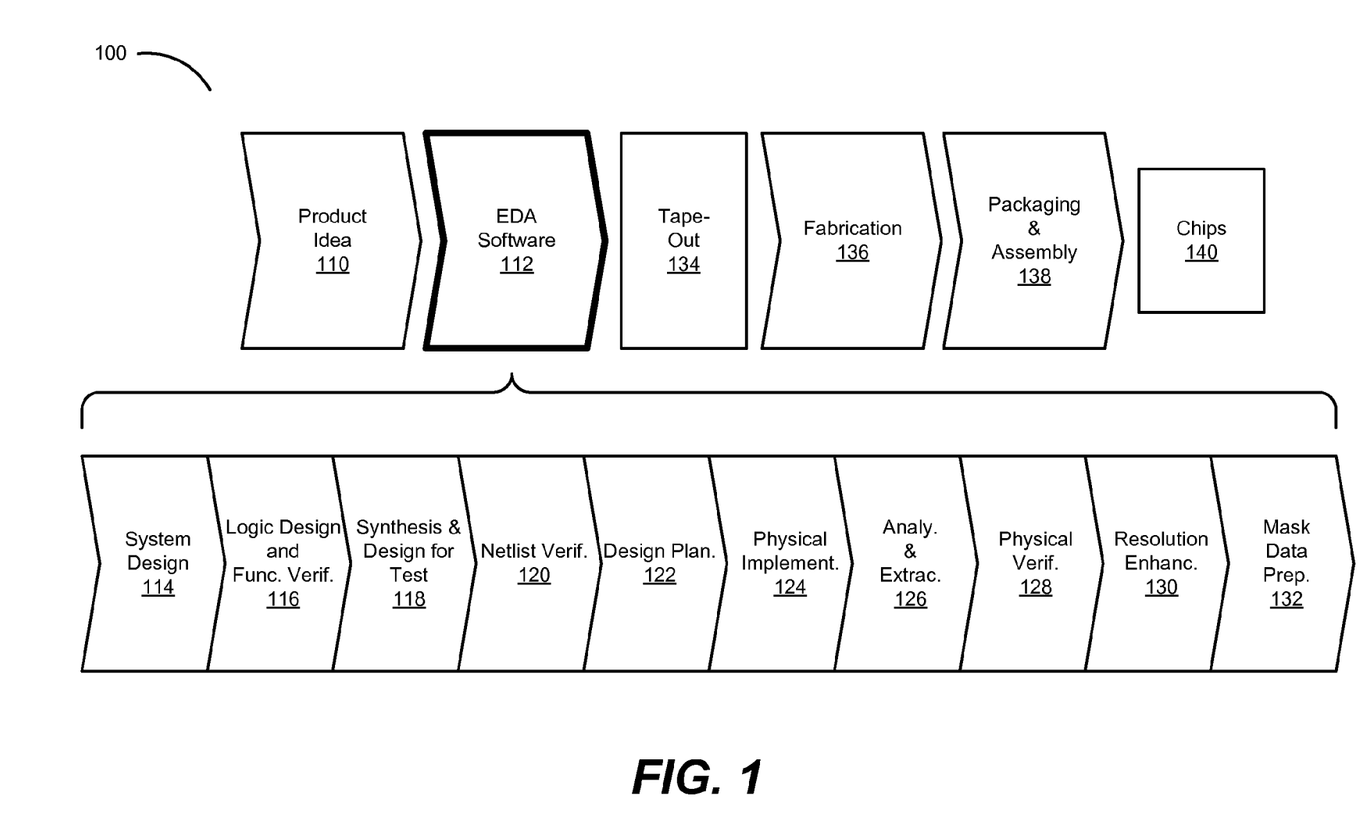
FIG. 1 is a flowchart illustrating various operations in the design and fabrication of an integrated circuit, according to one embodiment.

FIG. 1 is a flowchart 100 illustrating a process for designing and fabricating an integrated circuit (IC), according to one embodiment. The memory designed and fabricated via the process shown in FIG. 1 can include a memory array, and generally can be used for a computing device (e.g., a desktop computer, a laptop computer, a mobile phone, a tablet device, etc.). The process starts with the generation of a product idea 110, which is realized during a design process that uses electronic design automation (EDA) software 112. When the design is finalized, it can be taped-out 134. After tape-out, a semiconductor die is fabricated 136 to form the various objects (e.g., gates, metal layers, vias) in the memory design. Packaging and assembly processes 138 are performed, which result in finished chips 140.

Figure 3:
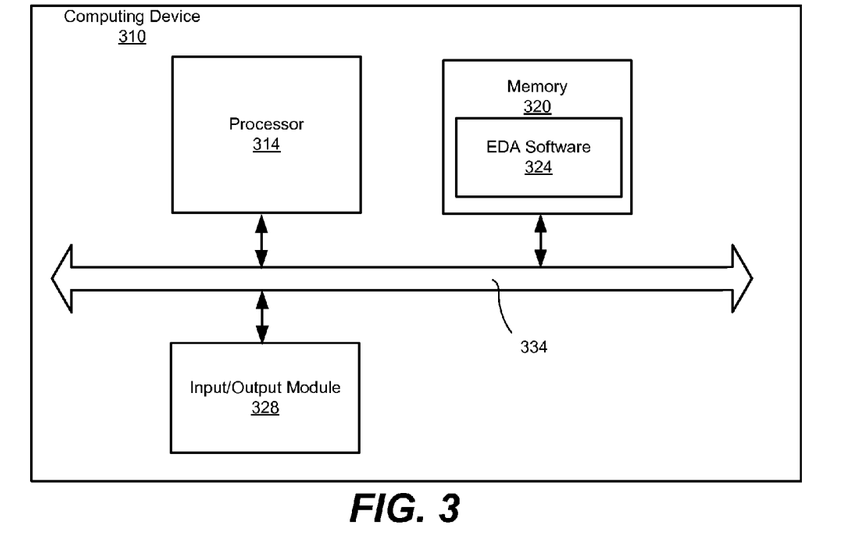
FIG. 3 is a block diagram illustrating a computing device for performing electronic design automation (EDA) operations, according to one embodiment.

The EDA software 112 may be stored and executed on one or more computing device 310 of FIG. 3. For example, the EDA software 112 is stored as instructions in the computer-readable medium which are executed by a processor for performing operations 114-132 of the design flow, which are described below. This design flow description is for illustration purposes. In particular, this description is not meant to limit the present disclosure. For example, an actual memory design may require a chip designer to perform the design operations in a different sequence than the sequence described herein.

During system design 114, a chip designer describes the functionality and/or structures to be implemented in an IC. For example, the chip designer can configure memory instance to be incorporated into the IC by specifying number of rows and columns in bit cells, presence of address scrambling and/or by loading a memory layout provided by a memory design provider. Example EDA software products from Synopsys, Inc. of Mountain View, Calif. that can be used at this stage include: Model Architect®, Saber®, System Studio®, and Designware® products. EDA software products specializing in the design of memory include, among others, Designware STAR Memory System® product for performing memory test and repair operations.

During logic design and functional verification 116, VHDL or Verilog code for modules in the circuit is written and the design is checked for functional accuracy. More specifically, the design is checked to ensure that it produces the correct outputs. Example EDA software products from Synopsys, Inc. of Mountain View, Calif. that can be used at this stage include: VCS®, Vera®, 10 Designware®, Magellan®, Formality®, ESP® and Leda® products.

During synthesis and design for test 118, VHDL/Verilog is translated to a netlist. This netlist can be optimized for the target technology. Additionally, tests can be designed and implemented to check the finished chips. Example EDA software products from Synopsys, Inc. of Mountain View, Calif. that can be used at this stage include: Design Compiler®, Physical Compiler®, Test Compiler®, Power Compiler®, FPGA Compiler®, Tetramax®, and Designware® products.

During netlist verification 120, the netlist is checked for compliance with timing constraints and for correspondence with the VHDL/Verilog source code. Example EDA software products from Synopsys, Inc. of Mountain View, Calif. that can be used at this stage include: Formality®, Primetime®, and VCS® products.

During design planning 122, an overall floor plan for the chip is constructed and analyzed for timing and top-level routing. Example EDA software products from Synopsys, Inc. of Mountain View, Calif. that can be used at this stage include: Astro® and IC Compiler® products.

During physical implementation 124, the placement (positioning of circuit elements) and routing (connection of the same) occurs. Example EDA software products from Synopsys, Inc. of Mountain View, Calif. that can be used at this stage include: the Astro® and IC Compiler® products.

During analysis and extraction 126, the circuit function is verified at a transistor level, which permits refinement. Example EDA software products from Synopsys, Inc. of Mountain View, Calif. that can be used at this stage include: Astrorail®, Primerail®, Primetime®, and Star RC/XT® products.

During physical verification 128, the design is checked to ensure correctness for: manufacturing, electrical issues, lithographic issues, and circuitry. Example EDA software products from Synopsys, Inc. of Mountain View, Calif. that can be used at this stage include the Hercules® product.

During resolution enhancement 130, geometric manipulations of the layout are performed to improve manufacturability of the design. Example EDA software products from Synopsys, Inc. of Mountain View, Calif. that can be used at this stage include: Proteus®, Proteus®AF, and PSMGED® products.

During mask-data preparation 132, the 'tape-out' data for production of masks to produce finished chips is provided. Example EDA software products from Synopsys, Inc. of Mountain View, Calif. that can be used at this stage include the CATS® family of products.

Embodiments of the present disclosure can be used during one or more of the above-described stages. Specifically, in some embodiments the present disclosure can be used in EDA software 112 that includes operations of system design 114.

Process for Designing Test and Repair Engine

Figure 2:
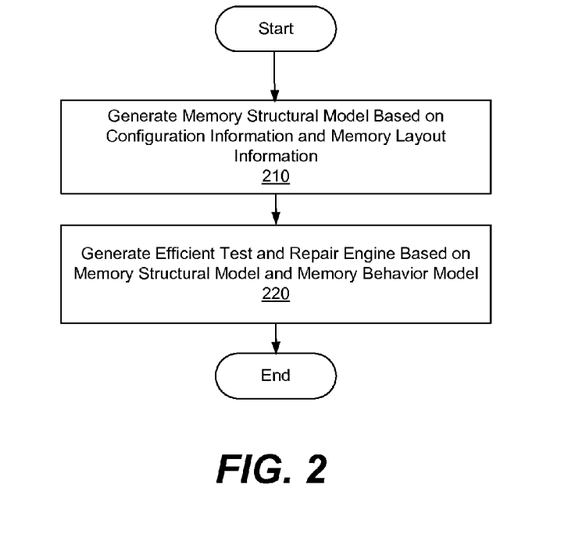
FIG. 2 is a flowchart illustrating an overall process of designing an efficient test and repair engine, according to one embodiment.

FIG. 2 is a flowchart illustrating an overall process of designing an efficient test and repair engine, according to one embodiment. First, a memory structural model is generated 210 based on configuration information and memory layout information. The memory structural model defines the structure of the memory and may include address scrambling information and strap distribution information. The memory structural model may include structural primitives describing physical layout features of a memory array, for example, as described in U.S. Pat. No. 7,768,840 entitled "Memory Modeling Using an Intermediate Level Structural Description," filed on Aug. 29, 2007, which is incorporated reference herein in its entirety. The memory structural model can be used for various purposes including, but not limited to, (i) designing an efficient test and repair engine for a memory instance corresponding to the memory structural model, (ii) reporting physical coordinates of cells in a memory instance corresponding to the memory structural model, (iii) calculating the memory yield, and (iv) designing an efficient error correcting coding schemes.

In one embodiment, the configuration information of the memory instance is received from the chip designer. The configuration information may include, for example, the number of memory words, the number of bits per word, column multiplexing, row distribution, column distribution, the height of each bit cell in the memory array, and the width of each bit cell in the memory array.

The memory layout information describes geometric information of a memory instance and can be formatted into a GDS format or other similar format. In one embodiment, the memory layout information is provided in the form of a file provided by a memory design provider.

The conventional process of building and verification a memory structural model is a time consuming and complicated process. First, in a conventional process, the memory structural model is extracted by analyzing the geometric structure defined in the memory layout information. However, a chip designer may not possess necessary information and tools for extracting the memory structural model from the memory layout information since the memory layout information is often in a GDS format that is not easily converted into a memory structural model. Moreover, the chip designer may not have all the information necessary for building the memory structural model. Specifically, the chip designer generally receives memory layout information from the memory design provider. The memory design provider may make available only limited information and not provide information such as column scramble, row scramble, bit-line twisting, strap locations and size of the straps to the chip designer. Hence, even if the chip designer has the right tools, the chip designer may be unable to build the memory structural model due to lack of necessary information.

Embodiments generate the memory structural model without analyzing the structure of the memory instance as defined by the memory layout information. Specifically, embodiments extract strap information based on the configuration information and the memory layout, and generate the memory structural model by programming physical bit patterns into the memory instance having the memory layout, simulating the operation of the programmed memory instance and extracting logical bit patterns corresponding to the physical bit patterns based on the simulation and comparing the physical and logical bit patterns, as described below in detail with reference to FIG. 9.

After generating the memory structural model, an efficient test and repair engine for a memory instance corresponding to the memory structural model can be generated by using the memory structural model and a memory behavior model of the memory instance. The memory behavior model describes the behavior of the memory, such as information about ports and repair schemes.

The test and repair engine designed using the memory structural model is efficient in the sense that the test and repair engine can thoroughly test a proper operation of cells in the memory instance or memory device by applying a fewer number of logical bit patterns in the memory instance or memory device and reading a correspondingly fewer number of logical bit patterns from the memory instance or memory device. Using memory structural model the logical pit patterns are generated to correspond to physical bit patterns designed for efficient sensitization and detection of memory faults.

Architecture of Computing Device and EDA Software

FIG. 3 is a block diagram illustrating a computing device 310 for performing electronic design automation (EDA) operations, according to one embodiment. Specifically, FIG. 3 shows a diagrammatic representation of a machine in the example form of a computer device 310 within which EDA software 324 for causing the machine to perform any one or more of the methodologies and processes discussed herein. The computing device 310 may be connected (e.g., networked) to other machines. In a networked deployment, the computing device 310 may operate in the capacity of a server machine or a client machine in a server-client network environment, or as a peer machine in a peer-to-peer (or distributed) network environment.

The computing device 310 may include, among other components, a processor 314, a memory 320, an input/ output module 328 and a bus 334 connecting these components. The computing device 310 may include various other components not illustrated in FIG. 3 (e.g., a network module). The processor 314 executes instructions and controls the operations of other components in the computing device 310. Although only a single processor is illustrated in FIG. 3, multiple processors may be used to process multiple operations in parallel.

The memory 320 is a non-transitory machine readable storage medium storing instructions and data. The memory 320 can be implemented as read-only memory (ROM), random access memory (RAM) or other types of memory devices. The memory 320 stores, among other instruction modules, an operating system (OS) (not shown) and EDA software 324.

The input/output module 328 interfaces with the chip designer. The input/output module 328 may include, among other components, graphic cards and input devices (e.g., keyboard and mouse). Although illustrated as a single module, the input/output module 328 may include a number of sub-modules, each configured to interact with a specific input or output device.

Figure 4:
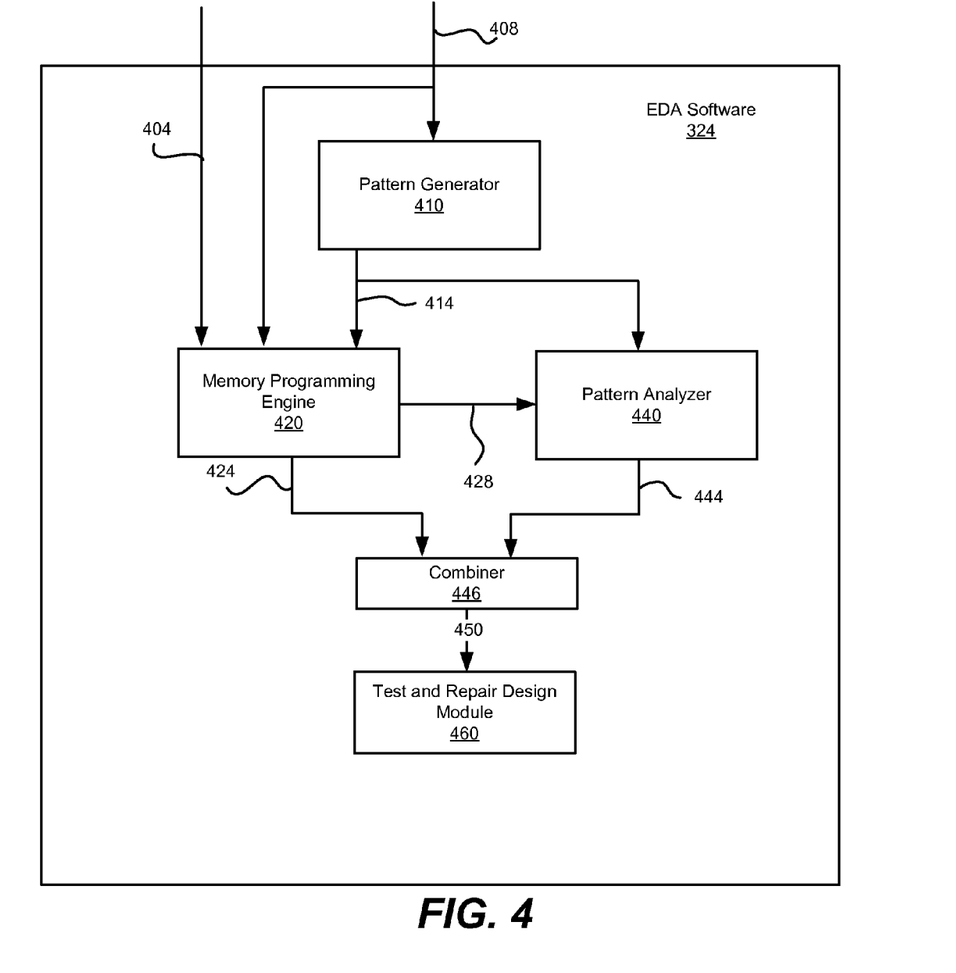
FIG. 4 is a block diagram illustrating components in an EDA software, according to one embodiment.

FIG. 4 is a block diagram illustrating components in the EDA software 324, according to one embodiment. The EDA software 324 may include, among other components, a pattern generator 410, a memory programming engine 420, a pattern analyzer 440, a combiner 446 and a test and repair design module 460. In one embodiment, the EDA software 324 is part of Designware STAR Memory System® product available from Synopsys, Inc. Specifically, the EDA software 324 may be part of MASIS Compiler® in the Designware STAR Memory System® product.

The pattern generator 410 generates physical bit patterns 414 for programming into a memory layout according to the memory layout information 404. For this purpose, the pattern generator 410 receives configuration information 408 of the memory instance to be designed. The physical bit patterns 414 generated include, for example, solid bit patterns (described below in detail with reference to FIGS. 5A through 5C), triangular bit patterns (described below in detail with reference to FIGS. 6A through 6C), binary bit patterns (described below in detail with reference to FIGS. 7 through 8C). The pattern generator 410 generates these physical bit patterns depending on the number of rows and the number of columns of the memory array in the memory instance, as specified in the configuration information 408.

The memory programming engine 420 generates strap information 424 and extracts logical bit patterns 428 corresponding to the physical bit patterns 414. To generate the strap information 424, the memory programming engine 420 analyzes the configuration information 408 in view of the memory layout information 404 to determine the locations and orientations of straps, as described below in detail in a section titled "Example Extraction of Strap Information." To extract the logical bit patterns 428, the memory programming engine 420 programs physical bit patterns 414 into the memory layout (as defined by the memory layout information 404) and then performs simulation on the programmed memory layout. The logical bit patterns 428 are extracted as a result of the simulation.

The pattern analyzer 440 determines the address scrambling of the memory instance by comparing the physical bit patterns 414 and the logical bit patterns 428 corresponding to the physical bit patterns 414. Specifically, the pattern analyzer 440 determines if actual logical bit patterns 428 extracted by the memory programming engine 420 deviate from logical bit patterns, and if so, which address scrambling would result in such deviation. Based on the difference in the physical bit patterns and the logical bit patterns, i.e., logical bit patterns are not corresponding to the physical bit patterns, or vice-versa, the address scrambling in the memory layout can be determined. As a result of the analysis, the pattern analyzer 440 generates address scrambling information 444.

The strap information 424 and the address scrambling information 444 are fed to the combiner 446. The combiner 446 generates the memory structural model 450 by combining the strap information 424 and the address scrambling information 444. Strap information and address scrambling can be described by different formats. For example, each entry of strap information and address scrambling can be described by in terms of sequences. For example, row scrambling can be {0 2 4 6 1 3 5 7}. This means that physical row 0 corresponds to logical row 0, physical row 1 corresponds to logical row 2, physical row 2 corresponds to logical row 4, physical row 3 corresponds to logical row 6, physical row 4 corresponds to logical row 1, physical row 5 corresponds to logical row 3, physical row 6 corresponds to logical row 5, physical row 7 corresponds to logical row 7.

The generated memory structural model 450 is then fed to the test and repair design module 460 to design an efficient test and repair design module 460. The test and repair design module 460 designs a test and repair engine for a specific memory instance based on the memory structural model 450 corresponding to the specific memory instance, using a process well known in the art.

Example Extraction of Strap Distribution

The strap distribution is extracted by analyzing the configuration information 408 in view of the memory layout information 404. Specifically, the locations of bit cells in the memory array are determined by memory programming engine 420 based on the parameters in the configuration information 408 and the memory layout information 404. After determining the locations, the memory programming engine 420 determines if the right end, bottom, top or left end cells have coordinates that are inconsistent with the size of the memory layout to determine the presence of left, top, bottom or right strap. Further, the memory programming engine 420 determines if any rows or columns of adjacent bit cells have distance more than zero to determine if there is a strap between any of these rows or columns.

An example of extracting strap distribution is explained herein to facilitate understanding. Assume that the memory layout information 404 indicates that the configuration of a memory instance is as follows: (i) the height of the memory instance is 40 microns, (ii) the width of the memory instance is 40 microns, (iii) the height of each cell is 0.36 microns, and (iv) the width of each cell is 0.83 microns. The memory programming engine 420 can also identify the locations of each bit cell in the memory layout by searching for rectangular shapes having the height and width of the bit cells as defined in the configuration information 408. Based on the identified locations of each bit cell, the boundary coordinates of the cell (e.g., a bottom left coordinate of a cell, and an upper right coordinate of the cell) can be determined. Assume that the coordinates of the cells in Row 0 in the memory layout are determined by the memory programming engine 420 as follows:

Cell (0, 0): (x1, y1)=(20.00, 25.00), (x2, y2)=(20.83, 25.36)

Cell (0, 1): (x1, y1)=(20.83, 25.00), (x2, y2)=(21.66, 25.36)

Cell (0, 2): (x1, y1)=(21.66, 25.00), (x2, y2)=(22.49, 25.36)

Cell (0, 3): (x1, y1)=(22.49, 25.00), (x2, y2)=(23.32, 25.36)
Cell (0, 4): (x1, y1)=(33.32, 25.00), (x2, y2)=(34.15, 25.36)
Cell (0, 5): (x1, y1)=(34.15, 25.00), (x2, y2)=(34.98, 25.36)
Cell (0, 6): (x1, y1)=(34.98, 25.00), (x2, y2)=(35.81, 25.36)
Cell (0, 7): (x1, y1)=(35.81, 25.00), (x2, y2)=(36.64, 25.36)
where cell (m, n) refers to cell at mth row and nth column, and (x1, y1) refers to the coordinate of the bottom left corner of a cell and (x2, y2) refers to the coordinate of a upper right corner of the cell.

Further assume that the coordinates of the cells in Row 1 of the memory layout are as follows:
Cell (1, 0): (x1, y1)=(20.00, 27.36), (x2, y2)=(20.83, 27.72)
Cell (1, 1): (x1, y1)=(20.83, 27.36), (x2, y2)=(21.66, 27.72)
Cell (1, 2): (x1, y1)=(21.66, 27.36), (x2, y2)=(22.49, 27.72)
Cell (1, 3): (x1, y1)=(22.49, 27.36), (x2, y2)=(23.32, 27.72)
Cell (1, 4): (x1, y1)=(33.32, 27.36), (x2, y2)=(34.15, 27.72)
Cell (1, 5): (x1, y1)=(34.15, 27.36), (x2, y2)=(34.98, 27.72)
Cell (1, 6): (x1, y1)=(34.98, 27.36), (x2, y2)=(35.81, 27.72)
Cell (1, 7): (x1, y1)=(35.81, 27.36), (x2, y2)=(36.64, 27.72)
where (x1, y1) refers to the coordinate of the bottom left corner of a cell and (x2, y2) refers to the coordinate of a upper right corner of the cell.

The following strap information can be obtained by analyzing the coordinates. A vertical strap exists at the left of the first column (column 0) since the first cell columns have x coordinate value of 20. The width of the vertical left strap is 20 microns since the first column starts from x coordinate of 20 microns. Further, the difference between x1 coordinate of cell (0, 4) and x2 coordinate of cell (0, 3) (or x1 coordinate of cell (1, 4) and x2 coordinate of cell (1, 3)) is 10 microns, the memory programming engine 420 determines that there is a vertical strap of width 10 microns between these cells.

Also, the memory programming engine 420 determines that there is a vertical strap to the right of the last column of cells because the difference between the width of the memory layout and x2 coordinate of cells (0, 7) (or cell (1, 7)) is 3.36 microns. There is also a bottom strap of height 25 microns since y1 coordinate of cell (0, 0) is 25. A horizontal strap of height of 2 microns exist between cell (1, 0) and cell (0, 0) since the difference between y1 coordinate of cell (1, 0) and y2 coordinate of cell (0, 0) is 2 microns.

Finally, the memory programming engine 420 determines that there is a top strap of 12.28 microns extending horizontally because the difference between the height of the memory layout and y2 coordinate of cell (1, 0) is 12.28 microns.

Example of Physical Bit Patterns

The physical bit patterns may be programmed into a memory layout and the corresponding logical bit patterns may be extracted for comparison with the physical bit patterns. The specific physical bit patterns may differ depending on the configuration of the memory array (e.g., the number of rows and the number of columns). Each physical bit pattern may also be used to extract certain types of address scrambling or cell configuration. For example, a solid physical bit pattern may be used to determine the bit-line distribution in cells whereas the physical triangular pattern may be used to determine row scrambling in a subset of rows or column scrambling in a subset of columns.

A series of physical bit patterns is generated for a memory layout based on the configuration information of the memory instance. The generated physical bit patterns may include, among others, solid patterns, triangular patterns, and binary patterns. A solid pattern programs all the bit cells in the memory layout with the same 0 or 1 bit. By extracting a logical bit pattern corresponding to the solid pattern and comparing these two patterns, the bit distribution in the cell can be determined. A physical triangular pattern programs certain bit cells in a triangular shape in 0 (or 1) while programming the remaining bit cells in 1 or (0). In a physical binary pattern, each of a subset of columns or rows has a unique combination of 0 and 1.

Figure 5A:
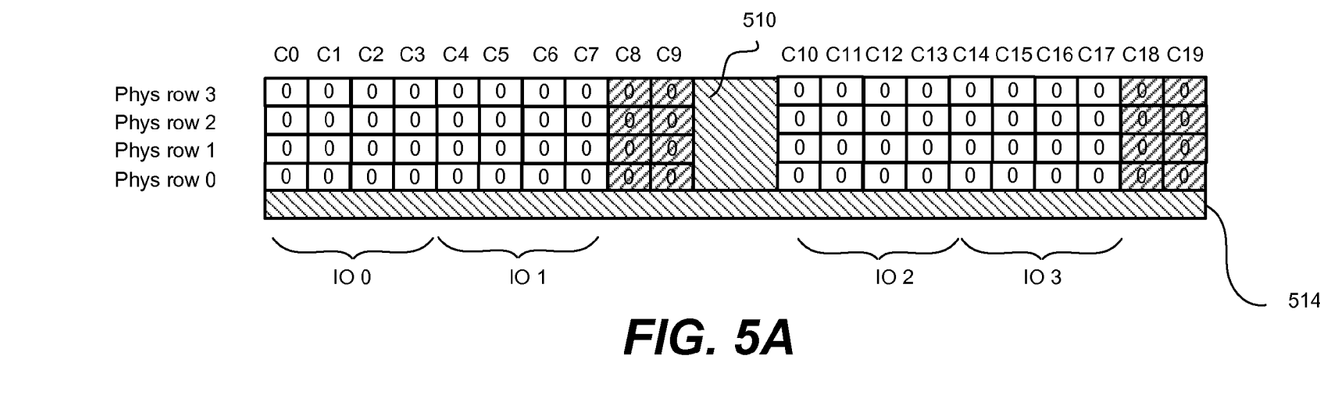
FIG. 5A is diagram illustrating a memory array programmed with a physical solid pattern, according to one embodiment.

FIG. 5A is diagram illustrating a memory array programmed with a physical solid pattern, according to one embodiment. The memory array of FIG. 5A includes four rows and twenty columns of bit cells, a vertical strap 510, and a horizontal strap 514. The memory has four IOs, IO 0 through IO 3), and has four columns (C8, C9, C18, C19) of redundant cells that are used for replacing defective columns. As shown in FIG. 5A, all the cells in the memory array are programmed with 0 bit (solid 0 pattern). By extracting a logical bit pattern corresponding to the solid pattern and then comparing these two patterns, bit-line distribution of cells can be determined.

Figure 5B:
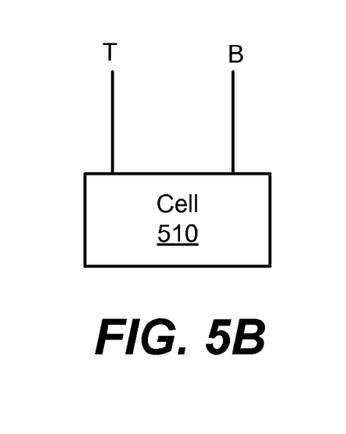
FIGS. 5B and 5C are block diagrams illustrating two different bit-line distributions, according to one embodiment.
Figure 5C:
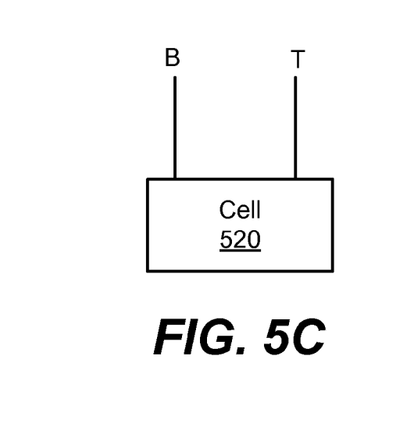

A bit cell has two bit-lines, one is a true bit line and the other is a false bit-line. FIGS. 5B and 5C are block diagrams illustrating two different bit-line distributions, according to one embodiment. As illustrated in FIG. 5B, a bit cell 510 may have a true bit-line (T) at its left and a false bit-line (B) at its right. Alternatively, a bit cell 520 may have a false bit-line (B) at its left and a true bit-line (T) at its right.

If the logical bit patterns extracted after programming a solid 0 bit pattern (where all bit cells are programmed with 0 bit) is also a solid 0 bit pattern, the pattern analyzer 440 determines that the cells in the memory layout has a bit-line configuration as illustrated in FIG. 5B. Conversely, if the logical bit patterns extracted after programming a solid 0 bit pattern is solid 1 bit pattern, the pattern analyzer 440 determines that the cells in the memory layout have a bit-line configuration as illustrated in FIG. 5C. Further, some cells in a memory layout may have a bit-line configuration different from the other cells in the same memory layout. By analyzing the inverted bits in the logical bit pattern and identifying the corresponding locations of the physical cells, the bit-line distribution of cells in the memory layout can be determined. In one embodiment, the solid bit pattern is applied after the mapping between the physical locations of the bit cells and the logical addresses is determined (e.g., by applying a triangular bit pattern and one or more binary bit patterns as set forth below with reference to FIGS. 5A through 8C). Because the mapping of the physical locations and the logical addresses is known, the bit-line distribution of each individual bit cell can be determined from the difference between the solid bit pattern and the corresponding logical bit pattern.

Figure 6A:
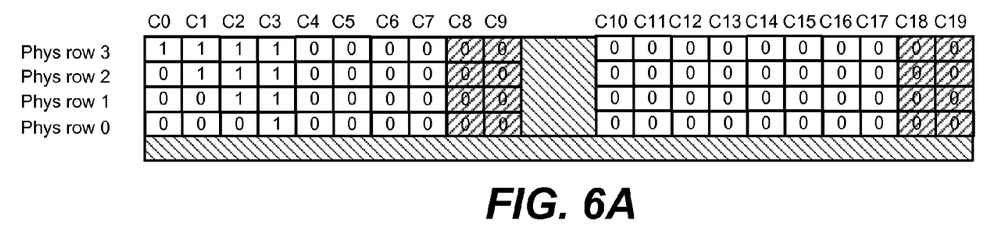
FIG. 6A is a diagram illustrating a memory array programmed with a physical triangular pattern, according to one embodiment.

For a memory array having more columns of bit cells compared to rows of bit cells, a triangular bit pattern may be used to determine row scrambling for all of the rows and column scrambling for a subset of columns. FIG. 6A is a diagram illustrating a memory array programmed with a physical triangular pattern, according to one embodiment. The memory array of FIG. 6A has the same configuration as the memory array of FIG. 5A (and thus, has more columns than rows). By using a triangular physical bit pattern where a subset of cells arranged in a triangular shape are programmed with 1 bit (as shown in FIG. 6A) and comparing with a corresponding logical bit pattern, the row scrambling for all physical rows (rows 0 through 3) and the column scrambling of columns C0 through C3 can be determined.

Assuming that there is no bit-line twisting and there is no column scrambling, row scrambling can be determined by identifying rows in the physical bit pattern and the logical bit pattern with the same number of 1 bits. Taking the example of FIG. 6A, if a row in a logical bit pattern includes two entries of 1, this row would correspond to physical row 1.

Furthermore, the discrepancy in the entries in a row of a physical bit pattern and the entries of a row of a logical bit pattern indicates column scrambling. For example, assume that there is no row scrambling in the memory layout of FIG. 6A, and that a row in a logical bit pattern corresponding to physical row 0 is [0, 1, 0, 0, 0, 0, 0, 0, 0, 0, 0, 0, 0, 0, 0, 0, 0, 0, 0, 0]. The placement of 1 bit in the second column (as opposed to the fourth column) of the logical bit pattern indicates that there is column scrambling between columns C1 and C3 of the memory layout. By comparing the locations of 0 and 1 value in the columns of the physical row and the logical row, the address scrambling in the first four columns of the memory layout can be determined. The column scrambling for the remaining columns in the memory array can be determined using a binary pattern, as described below in detail with reference to FIGS. 7 through 8C.

Figure 6B:
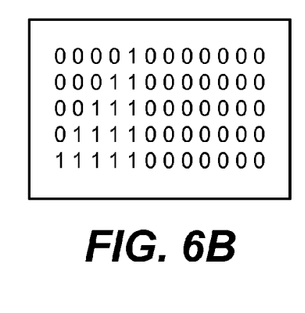
FIGS. 6B and 6C are diagrams illustrating physical triangular patterns, according to one embodiment.
Figure 6C:
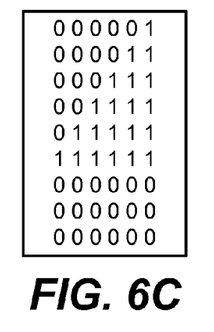

FIGS. 6B and 6C are diagrams illustrating examples of other physical triangular patterns, according to one embodiment. The memory array associated with FIG. 6B has more columns than rows of cells. In the example of FIG. 6B, more cells are filled with 1 bit as the column number increases from the first column to the fifth column. Conversely, the memory array associated with FIG. 6C has more rows than columns of cells. In the example of FIG. 6C, more cells are filled with 1 bit as the row number increases from the first row to the sixth row.

The physical triangle pattern is merely illustrative. Rather than using a physical triangle pattern, other patterns where a subset of columns (for a memory array having more columns than rows) have a different number of their cells filled with 0 or 1 bit or where a subset of rows (for a memory array having more rows than columns) have different number of their cells filled with 0 or 1 bits may also be used. Further, the cells filled with 1 bit (or 0 bit) need not be contiguous. For example, odd numbered columns may be partially or entirely filled with 1 bit while even numbered columns may be filled entirely with 0 bit.

Figure 7:
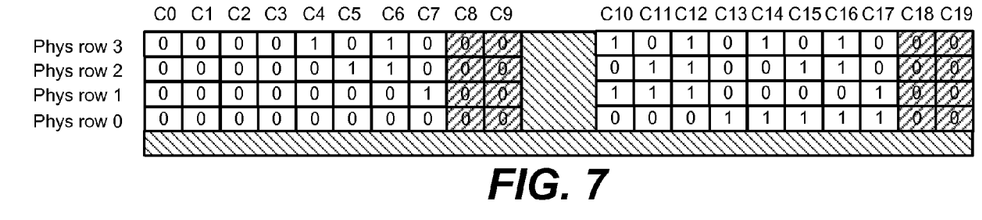
FIG. 7 is a diagram illustrating a memory array programmed with a physical binary pattern, according to one embodiment.

FIG. 7 is a diagram illustrating a memory array programmed with a physical binary pattern, according to one embodiment. As set forth above, the column scrambling for columns C0 through C3 can be determined by using the triangular bit pattern as illustrated above in detail with reference to FIG. 6A. The column scrambling for the remaining columns C4 through C7 and C10 through C17 can be determined by programming a unique binary pattern. Assuming that there is no row scrambling, a logical column with a row pattern of row elements 0 through 3 would correspond to a physical column with the same elements. For example, if a logical column has row elements [0, 0, 1, 0], this would correspond to a physical column C7. If there is any row scrambling, the row elements in either the logical columns or the physical columns should be rearranged and then compared to account for the row scrambling.

During programming of a triangular bit pattern or a binary bit pattern, all of the redundant cells for repair operation are programmed with 0 bit (or 1 bit). In the above examples of FIGS. 6A and 7, columns C8, C9, C18 and C19 are programmed with 0 bits. Cells in these columns may be later used to replace any defective columns.

Although the memory array in the embodiment of FIG. 7 has less than 15 columns (i.e., $2^4-1$) which require analysis for determining the column scrambling, a series of shifting binary bit patterns may be used if the number of columns requiring analysis is larger than the maximum number of bit patterns that can be represented by four rows.

Figure 8A:
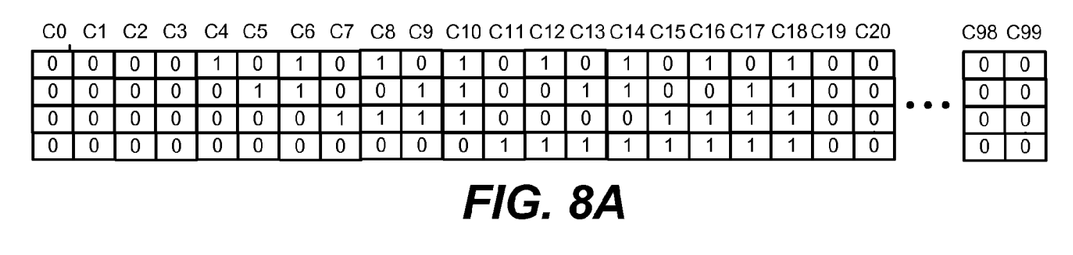
FIGS. 8A through 8C are diagrams illustrating a memory array programmed with different physical binary patterns, according to one embodiment.
Figure 8B:
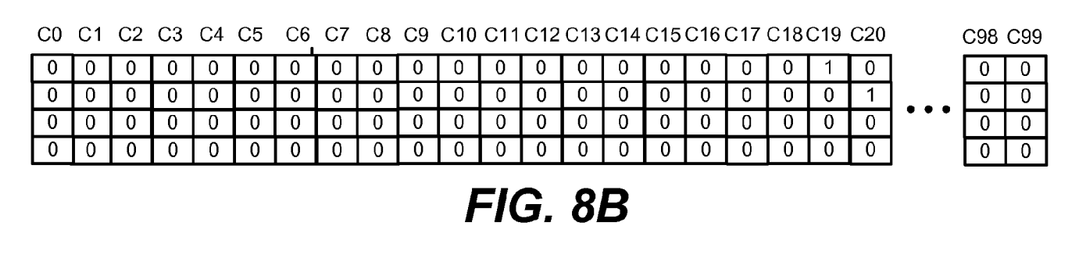
Figure 8C:
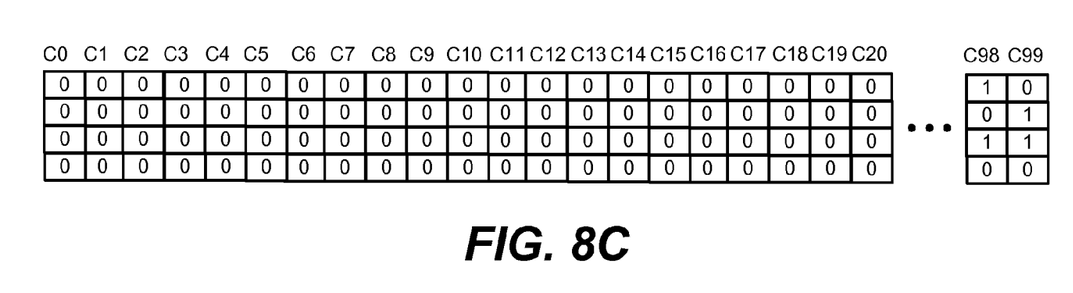

FIGS. 8A through 8C are diagrams illustrating a memory array with 100 columns and 4 rows, each figure representing programming of the memory array with a different physical binary pattern, according to one embodiment. Assume that row scrambling and column scrambling for columns C0 through C3 were already determined using a physical triangular pattern. Because, the memory array has only four rows, the maximum number of unique binary pattern is 15 (i.e., $2^4-1$) spanning across columns C4 through C18. First, the memory array is programmed with the physical bit pattern of FIG. 8A, and then a logical bit pattern corresponding to this bit pattern is extracted to determine the column scrambling for columns C4 through C18.

A physical bit pattern of FIG. 8B is then programmed into the memory array, and then a logical bit pattern corresponding to this bit pattern is extracted to determine the column scrambling for columns C19 through C33. The physical bit pattern of FIG. 8B is shifted to the right by 15 columns. Columns C0 through C18 and C34 through C99 are filled with 0 bit. Subsequently, different bit patterns covering different ranges of columns are programmed and then corresponding bit patterns are extracted to determine column scrambling for remaining columns. The last bit pattern covers columns C94 through C99 as illustrated in FIG. 8C.

The series of physical binary patterns as shown in FIGS. 8A through 8C is merely illustrative. Different series of binary patterns in a different sequence can also be used to determine column scrambling. Also, the number of rows in the memory array can be fewer or more than four.

Although examples of a memory array having more columns than rows are described above with reference to FIGS. 8A through 8C, similar bit patterns may be used to determine the address scrambling for a memory array having more rows than columns.

Example Process of Generating Memory Structural Model

Figure 9:
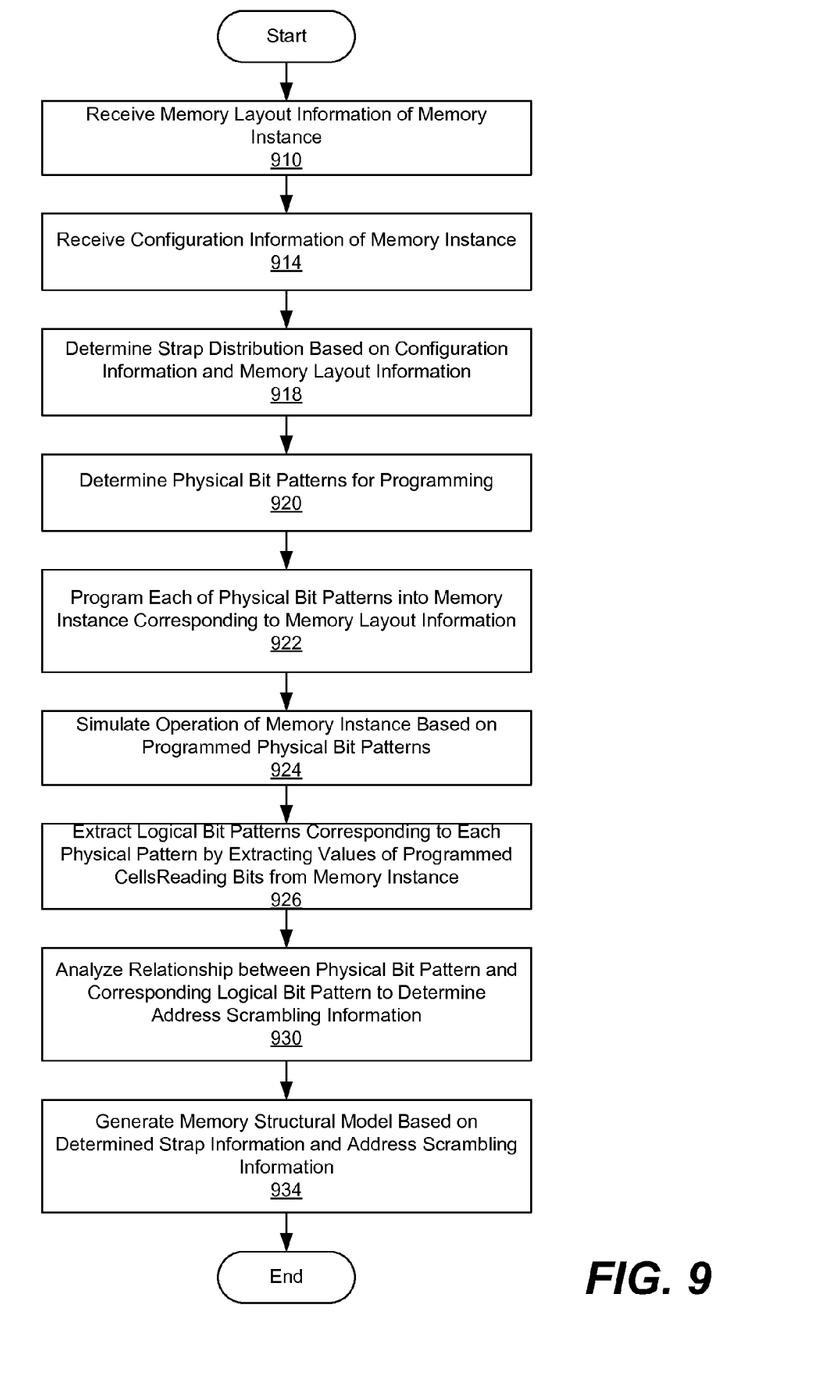
FIG. 9 is a flowchart illustrating the process of designing a memory structural model, according to one embodiment.

FIG. 9 is a flowchart illustrating the process of generating a memory structural model, according to one embodiment. First, the memory layout information of a memory instance is received 910. For example, the memory layout information may be in the form of a file and can be provided by a memory device design provider. The configuration information of the memory instance is received 914. The configuration information may be provided, for example, by a chip designer.

Based on the memory layout information and the configuration information, the strap distribution is determined 918. Specifically, the memory programming engine 420 of the EDA software 324 determines the strap distribution by applying the parameters in the configuration information 408 to the memory layout information 404.

The physical bit patterns for programming into the memory layout of the memory instance are determined 920. The physical bit patterns may include, among other patterns, a solid bit pattern, a triangular bit pattern, and one or more binary bit patterns. The physical bit patterns to be used may differ based on the number of rows and columns of the memory array.

Each physical bit pattern is programmed 922 onto bit cells at certain physical locations of the memory instance corresponding to the memory layout information by the memory programming engine 420. The operation of the memory instance is then simulated 924 by the memory programming engine 420. The memory programming engine 420 extracts 926 a logical bit pattern corresponding to each physical bit pattern by extracting values of the programmed cells according to the simulation.

By analyzing 930 the relationship between each of the physical bit patterns and its counterpart logical bit pattern, certain aspects (e.g., column scrambling of a subset of columns) of the address scrambling information of the memory instance can be determined. The simulation 922 through analysis 930 may be repeated for all of the physical bit patterns to determine all aspects of the address scrambling. The address scrambling information may indicate, among others, bit distribution, column scrambling and row scrambling.

Based on the strap information and the address scrambling information, the memory structure model of the memory instance can be generated 934.

The process of FIG. 9 is merely illustrative and various modifications may be made. For example, the sequence of receiving 910 of memory layout information and receiving 914 of the configuration information may be reversed. Further, depending on the application, only strap distribution or address scrambling but not both may be computed.

Upon reading this disclosure, those of ordinary skill in the art will appreciate still additional alternative structural and functional designs through the disclosed principles of the embodiments. Thus, while particular embodiments and applications have been illustrated and described, it is to be understood that the embodiments are not limited to the precise construction and components disclosed herein and that various modifications, changes and variations may be made in the arrangement, operation and details of the method and apparatus disclosed herein without departing from the spirit and scope as defined in the appended claims.

What is claimed is:

1. A computer-implemented method for generating a memory structural model of a memory instance, the method comprising:
   receiving memory layout information of the memory instance;
   receiving configuration information of the memory instance, the configuration information not including address scrambling information;
   determining physical bit patterns for the memory structural model based at least on a number of row and a number of column of the memory instance as described in the configuration information;
   programming each of the physical bit patterns into a memory layout of the memory instance as defined by the memory layout information by applying each of the physical bit patterns to the memory layout;
   performing simulation of operation of the memory instance applied with the physical bit patterns;
   extracting a logical bit pattern corresponding to each of the physical bit patterns based on the simulation;
   at a computing device, analyzing each of the physical bit patterns and the extracted logical bit pattern and generating address scrambling information of the memory instance based on said analysis;
   generating strap information based on parameters in the configuration information and the memory layout information, wherein the strap information indicates locations and sizes of vertical and horizontal straps in the memory instance; and
   generating the memory structural model by combining the strap information and the address scrambling information.

2. The method of claim 1, wherein the physical bit patterns comprise a solid pattern, a triangular pattern and one or more binary patterns.

3. A computer-implemented method for generating a memory structural model of a memory instance, the method comprising:
   receiving memory layout information of the memory instance;
   receiving configuration information of the memory instance, the configuration information not including address scrambling information;
   determining physical bit patterns based on the configuration information;
   programming each of the physical bit patterns into a memory layout of the memory instance as defined by the memory layout information by applying each of the physical bit patterns to the memory layout;
   performing simulation of operation of the memory instance applied with the physical bit patterns;
   extracting a logical bit pattern corresponding to each of the physical bit patterns based on the simulation;
   at a computing device, analyzing each of the physical bit patterns and the extracted logical bit pattern and generating address scrambling of the memory instance based on said analysis; and
   generating the memory structural model based on the determined address scrambling.

4. The method of claim 3, wherein the physical bit patterns comprise a solid pattern, a triangular pattern and one or more binary patterns.

5. The method of claim 4, wherein the solid bit pattern is used for determining bit distribution of cells in the memory instance.

6. The method of claim 4, wherein the triangular pattern is used for determining row scrambling of all rows in the memory instance and column scrambling of a subset of columns in the memory instance if the memory instance has more columns of cells than rows of cells, or determining column scrambling of all columns in the memory instance and row scrambling of a subset of rows in the memory instance if the memory instance has more rows of cells than columns of cells.

7. The method of claim 6, wherein the one or more binary patterns are used for determining column scrambling of remaining columns in the memory instance if the memory instance has more columns of cells than rows of cells, or determining row scrambling of remaining rows if the memory instance has more rows of cells than columns of cells.

8. The method of claim 3, further comprising:
   generating strap information based on parameters in the configuration information and the memory layout information, wherein the strap information indicates locations and sizes of vertical and horizontal straps in the memory instance; and generating the memory structural model by combining the strap information and information indicative of the address scrambling.

9. The method of claim 3, further comprising designing a test and repair engine specific to the memory instance based on the memory structural model and a memory behavior model of the memory instance.

10. A non-transitory computer readable storage medium storing instructions thereon for generating a structural model of a memory instance, the instructions when executed by a processor causing the processor to:
  receive memory layout information of the memory instance;
  receive configuration information of the memory instance, the configuration information not including address scrambling information;
  determine physical bit patterns based on the configuration information;
  program each of the physical bit patterns into a memory layout of the memory instance as defined by the memory layout information by applying each of the physical bit patterns to the memory layout;
  perform simulation of operation of the memory instance applied with the physical bit patterns based on the memory layout defined by the memory layout information;
  extract a logical bit pattern corresponding to each of the physical bit patterns based on the simulation;
  at a computing device, analyzing each of the physical bit patterns and the extracted logical bit pattern and generating address scrambling of the memory instance based on said analysis; and
  generating the memory structural model based on the determined address scrambling.

11. The computer-readable storage medium of claim 10, wherein the physical bit patterns comprise a solid pattern, a triangular pattern and one or more binary patterns.

12. The computer-readable storage medium of claim 11, wherein the solid bit pattern is used for determining bit distribution of cells in the memory instance.

13. The computer-readable storage medium of claim 11, wherein the triangular pattern is used for determining row scrambling of all rows in the memory instance and column scrambling of a subset of columns in the memory instance if the memory instance has more columns of cells than rows of cells, or determining column scrambling of all columns in the memory instance and row scrambling of a subset of rows in the memory instance if the memory instance has more rows of cells than columns of cells.

14. The computer-readable storage medium of claim 11, wherein the one or more binary patterns are used for determining column scrambling of remaining columns in the memory instance if the memory instance has more columns of cells than all rows of cells, or determining row scrambling of remaining rows if the memory instance has more rows of cells than columns of cells.

15. The computer-readable storage medium of claim 10, further comprising instructions to:
  generate strap information based on parameters in the configuration information and the memory layout information, wherein the strap information indicates locations and sizes of vertical and horizontal straps in the memory instance; and
  generate the memory structural model by combining the strap information and information indicative of the address scrambling.

16. The computer-readable storage medium of claim 10, further comprising instructions to design a test and repair engine specific to the memory instance based on the memory structural model and a memory behavior model of the memory instance.

17. An integrated circuit fabricated from a representation of the integrated circuit, the representation comprising:
  a memory array for storing a plurality of bits; and
  a test and repair engine associated with the memory array, the test and repair engine designed based on a memory structural model generated by:
    receiving memory layout information of the memory instance;
    receiving configuration information of the memory instance, the configuration information not including address scrambling information;
    determining physical bit patterns based on the configuration information;
    programming each of the physical bit patterns into a memory layout of the memory instance by applying each of the physical bit patterns to the memory layout;
    performing simulation of operation of the memory instance applied with the physical bit patterns;
    extracting a logical bit pattern corresponding to each of the physical bit patterns based on the programming and simulating;
    analyzing each of the physical bit patterns and the extracted logical bit pattern;
    generating address scrambling of the memory instance based on the analysis; and
    generating the memory structural model based on the determined address scrambling.

18. The integrated circuit of claim 17, wherein the physical bit patterns comprise a solid pattern, a triangular pattern and one or more binary patterns.

19. The integrate circuit of claim 17, wherein the method further comprises:
  generating strap information based on parameters in the configuration information and the memory layout information, wherein the strap information indicates locations and sizes of vertical and horizontal straps in the memory instance; and
  generating the memory structural model by combining the strap information and information indicative of the address scrambling.

20. A computing device for generating a memory structural model of a memory instance, comprising:
  a processor;
  an input module configured to receive memory layout information and configuration information of the memory instance, the configuration information not including address scrambling information;
  a pattern generator configured to determine physical bit patterns based on the configuration information;
  a memory programming engine configured to:
    program each of the physical bit patterns into a memory layout of the memory instance as defined by the memory layout information by applying each of the physical bit patterns to the memory layout;
    perform simulation of operation of the memory instance applied with the physical bit patterns; and
    extract a logical bit pattern corresponding to each of the physical bit patterns based on the simulation;
  a pattern analyzer configured to analyze each of the physical bit patterns and the extracted logical bit pattern and generating address scrambling of the memory instance based on said analysis; and a combiner configured to generate the memory structural model based on the determined address scrambling.

21. The computing device of claim 20, wherein the memory programming engine is further configured to generate the strap information based on parameters in the configuration information and the memory layout information.

\* \* \* \* \*